(12) United States Patent
Boag et al.

(10) Patent No.: US 6,589,291 B1
(45) Date of Patent: Jul. 8, 2003

(54) DYNAMICALLY DETERMINING THE MOST APPROPRIATE LOCATION FOR STYLE SHEET APPLICATION

(75) Inventors: Scott A. Boag, Woburn, MA (US); John R. Hind, Raleigh, NC (US); Brad B. Topol, Apex, NC (US); Ajamu A. Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/287,989

(22) Filed: Apr. 8, 1999

(51) Int. Cl.$^7$ ............................................. G06F 15/00
(52) U.S. Cl. .................... 715/513; 715/501.1; 715/517; 715/500
(58) Field of Search ............................... 707/501.1, 500, 707/513, 511; 715/513, 501.1, 500, 511, 522, 516

(56) References Cited

U.S. PATENT DOCUMENTS

| | | | | |
|---|---|---|---|---|
| 5,129,052 A | * | 7/1992 | Barker et al. ................ | 707/514 |
| 5,584,026 A | | 12/1996 | Knudsen et al. .............. | 707/1 |
| 5,734,907 A | | 3/1998 | Jarossay et al. .............. | 717/141 |
| 5,860,073 A | * | 1/1999 | Ferrel et al. ................. | 707/513 |
| 5,899,975 A | * | 5/1999 | Nielsen .................... | 704/270.1 |
| 5,968,119 A | * | 10/1999 | Stedman et al. ............. | 709/219 |
| 6,023,714 A | * | 2/2000 | Hill et al. .................... | 345/760 |
| 6,154,738 A | * | 11/2000 | Call .......................... | 705/20 |
| 6,263,332 B1 | * | 7/2001 | Nasr et al. ................. | 707/104.1 |

OTHER PUBLICATIONS

Bickmore et al., "Digestor: device–independent access to the World Wide Web", Computer Networks and ISDN System Sep. 1997, pp. 1075–1082.*
Spyglass Prism 1.0. Copyright 1997, Spyglass, Inc., pp. 1–2.*
Spyglass Prism, "Concepts and Applications", Copyright 1997, Spyglass, Inc., pp. 1–8.*

* cited by examiner

Primary Examiner—Stephen S. Hong
Assistant Examiner—Thu V. Huynh
(74) Attorney, Agent, or Firm—Jeanine S. Ray-Yarletts; Marcia L. Doubet

(57) ABSTRACT

A method, system, and computer-readable code for dynamically determining the most appropriate location for applying style sheets. The style sheets may be applied on a server (and/or Web proxy), or on a client, or when multiple style sheets are to be applied, some may be applied at the server while others are applied at the client. Application at the client depends on the capabilities of the client device. If the client device cannot apply style sheets, then they are applied at the server, and the resulting document is sent to the client; otherwise, the document may be sent to the client, where the client will perform the application process. Optionally, the document may be trimmed before it is sent to the client, using a style sheet preprocessing technique. General-purpose style sheets may be leveraged advantageously where a device-specific style sheet is not available, increasing the applicability of such style sheets. The style sheets may be encoded in Extensible Stylesheet Language (XSL), Document Style Semantics and Specification Language (DSSSL), or any other style sheet language having equivalent semantics.

15 Claims, 3 Drawing Sheets

DYNAMICALLY DETERMINING THE MOST APPROPRIATE LOCATION FOR STYLE SHEET APPLICATION

RELATED INVENTIONS

IBM application Ser. No. 09/288,838 entitled "Achieving Complex Transformations with Dynamic Style Sheet Coalescing" and 09/287,988 (now U.S. Pat. No. 6,463,440) entitled "Retrieval of Style Sheets from Directories Based Upon Partial Characteristic Matching", filed concurrently herewith on Apr. 8, 1999.

BACKGROUND OF THE INVENTION

1. Field of the Invention

The present invention relates to a computer system, and deals more particularly with a method, system, and computer-readable code for dynamically determining the most appropriate location (whether on a server and/or Web proxy, or on a client) for applying style sheets. Furthermore, the present invention enables style sheet applicability to be increased.

2. Description of the Related Art

A "style sheet" is a specification of a style that is to be used when presenting a document. The style specification includes information such as the font and margins to be used, the formatting layout, and other types of information that indicate how the presented document should appear. Style sheets can be used for many types of presentation of a document, including printing the document, displaying it on a video display, processing the document by a speech synthesizer, etc. Consequently, style sheets may also be utilized to describe transformations from one document type to another (e.g. from MathML to HTML) or as filters which describe transformations to reduce the amount of content while maintaining the original document type.

One type of style sheet is an XSL Style Sheet. XSL Style Sheets are style sheets specified in XSL, which is a particular style sheet language. "XSL" is an acronym for "Extensible Stylesheet Language". An XSL Style Sheet specifies how an XML document is to be transformed for presentation, resulting in a different document which may or may not maintain the original document type. "XML" is an acronym for "Extensible Markup Language. XML is a standardized formatting notation, created for structured document interchange on the World Wide Web (hereinafter, "Web"). (Refer to "Extensible Markup Language (XML), W3C Recommendation Feb. 10, 1998" which is available on the World Wide Web at http://www.w3.org/TR/1998/REC-xml-19980210, for more information on XML; and to "Extensible Stylesheet Language (XSL), Version 1.0, World Wide Web Consortium Working Draft Dec. 16, 1998", hereinafter "XSL Specification", which is available on the Web at http://www.w3.org/TR/WD-xsl, for more information on XSL.)

Style sheets include "template rule" constructs, which define an input pattern and a template (also known as an "action") to use in creating an output result tree fragment. When applying a style sheet, the patterns in the templates are matched against the syntax of the source document. When a match is found with the template pattern, an output document fragment is created according to the actions specified in the template (which may include processing additional elements in the source document beyond the matching element). The source document is parsed recursively, until no more matching patterns are found. The resulting document fragments are then aggregated to yield a complete output document. (For more information on this process, refer to section 2, "Tree Construction", in the XSL Specification.) It is this template matching and substitution of different document elements according to the actions in the matching rules that enables style sheets to transform documents.

(While the term "document" is used herein when discussing encoded data and application of style sheets thereto, it is to be understood that the information on which a style sheet operates may represent any type of information, and is not limited to the traditional interpretation of the word "document". As one example, a style sheet may be used to process an encoded representation of records from a data repository which specify a company's sales data. As another example, a style sheet may be used to format employee information retrieved from a corporate database for presentation. For ease of reference, the term "document" will be used herein to refer to these diverse types of information.)

XML is emerging as a powerful methodology for representing document content, due to its ability to store data in a self-defining, portable manner. Style sheet languages such as XSL, along with their associated processors, are powerful tools for filtering data content encoded in notations such as XML, as well as for transforming documents encoded in one markup language into other markup languages such as HTML (HyperText Markup Language) or WML (Wireless Markup Language). Because of these features, style sheets have tremendous potential to aid in the process of transcoding data content. "Transcoding" refers to a process by which data content is transformed. A content-reducing "transcoding filter" may be applied to a file, to reduce the file size. Transcoding filters are software applications that algorithmically reduce the number of bits used to represent information while still retaining its essential content. Such filters are known in the art. For example, a transcoding filter can be applied to an image that was rendered using 256 colors (also known as "8-bit color"), to create a simpler version of the same image which uses only 16 colors. Or, the image could be converted to grayscale using a different transcoding filter. This type of filtering process greatly reduces the number of bytes in the resulting file.

One environment in which this type of content-reducing transcoding process is becoming quite important is with computing devices connected to a network using relatively expensive wireless connections which may have limited bandwidth, and/or with pervasive computing devices. Pervasive computing devices are typically small, constrained-storage devices such as "Smart Phones" or the WorkPad device from the International Business Machines Corporation (IBM). ("WorkPad" is a registered trademark of IBM.) Before sending data from a server to a constrained-storage device, or over a limited bandwidth connection, it may be beneficial to reduce the size of the data. The smaller file can then be transmitted more quickly and at less cost, and it is more likely that sufficient storage space will be available for receiving the file (and subsequently processing it) on the device.

Filtering style sheets may be considered a type of content-reducing transcoding filter. In addition to using style sheets for content reduction, style sheets that transform file content from one form to another may also be considered transcoding filters. This type of transcoding process may be beneficial in the wireless environment and with pervasive computing devices, and in any other environment where it is desirable to transform a file from one format into another. For example, a document encoded in a data file may not include any images or video files (and therefore might not benefit significantly from a reduction in size), but it may be desirable to transmit this document from a server to a handheld device. If the document is encoded in one markup language, such as XML, while the device is only capable of supporting a different markup language such as WML or WBXML ("Wireless Application Protocol Binary XML"), then a transcoding process needs to be performed. An appropriate transforming style sheet may be used to perform this process.

Some significant problems associated with using style sheets for transcoding have been addressed. The first related invention, "Achieving Complex Transformations with Dynamic Style Sheet Coalescing", discloses a novel technique for dynamically determining one or more transformations that may be used to transform an input document in a first notation into a document in a different notation, where the output notation is tailored to (among other things) the target environment where the document will be rendered for presentation. The second related invention, "Retrieval of Style Sheets from Directories Based Upon Partial Characteristic Matching", discloses a novel technique for retrieving style sheets from a directory or other repository, based upon a pattern-matching process which uses the characteristics of the style sheets. However, a number of areas remain which need to be addressed in order for style sheets to be used optimally for transcoding purposes.

One issue that remains with using style sheets for transcoding is the difference in capabilities among different types of end-user devices. Some devices are capable of supporting style sheet processors (for example, using browsers which contain or invoke style sheet processors), while other devices are not. Thus, it would be beneficial for a transcoding process or framework operating on a server to be able to off-load the style sheet processing to the end-user device when the device is capable of applying the style sheet directly; otherwise, the style sheet application must be performed on the server before transmitting the resulting document to the device.

A second issue that remains with using style sheets for transcoding is that, in some cases, an appropriate style sheet for transforming a document for a particular end-user device is not available. Style sheets (and style sheet processors) may be developed independently by software vendors, in-house programmers, etc., supporting a wide variety of transformations (and style sheet languages, respectively). For example, a style sheet may be created that is tailored to presenting the content of a specific document or data file, similar to the manner in which report-generating software programs operate on data files. Thus, the style sheets that are available in one computing environment may be quite different from those in another computing environment, and the selection available within an environment may change over time. Or, a new device type may appear on the market, for which no device-specific style sheets are yet available. Similarly, new markup languages may be written, and for some period of time there may be no style sheets available for transforming documents into the new language.

A related issue occurs when style sheets are dynamically selected using an end-user's preferences (such as may be stored in a directory or other repository). For example, a user preference may specify that all documents are to be presented using large fonts, or avoiding specific colors on a display, or using a voice synthesizer. A style sheet selected using user preference as the selection criteria may generate content that is not tailored for the particular end-user device.

Accordingly, a need exists for a technique by which the problems discussed above for using style sheets for transcoding can be addressed. The present invention provides a technique for dynamically determining the most appropriate location to apply style sheets, whether that location is the client device, the server, or some combination thereof. Furthermore, the present invention provides a technique for increasing the applicability of style sheets when a style sheet tailored to a particular target environment is not readily available.

SUMMARY OF THE INVENTION

An object of the present invention is to provide a technique for dynamically determining the most appropriate location to apply style sheets, whether that location is the client device, the server, or some combination thereof.

Another object of the present invention is to provide a technique for increasing the applicability of style sheets when a style sheet tailored to a particular target environment is not readily available.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer-readable code for use in a computing environment capable of having a connection to a network, for dynamically determining the most appropriate location to apply style sheets. The technique comprises: selecting one or more style sheets to transform a particular input document; determining whether a client device is capable of applying the selected style sheets; applying the selected style sheets at the client device when the determining has a positive result; and applying the selected style sheets at a server when the determining has a negative result. The determining may determine a first subset of the selected style sheets that the client device is capable of applying, and a second subset that the client device is not capable of applying. In that case, the applying at the client step applies the first subset, and the applying at the server step applies the to second subset.

In one aspect, when the determining has a positive result, the technique may further comprise: caching the selected style sheets at the server; modifying the input document to refer to the cached style sheets; and sending the modified input document to the client. When the determining has a negative result, the technique may further comprise: sending the input document to the client following completion of the applying at the server. In another aspect, when the determining step has a positive result, the technique further comprises: caching the selected style sheets at the server; modifying the input document to refer to the cached style sheets; trimming the modified input document using a style sheet preprocessor; and sending the trimmed input document to the client. In this aspect, when the determining has a negative result, the technique further comprises sending the input document to the client following completion of the applying at the server.

In yet another aspect, the technique may further comprise: first determining whether one or more of the selected style sheets requires resolution of variable factors; and second determining whether the client is capable of resolving the variable factors when the first determining has a positive result. When the second determining has a positive result, the technique further comprises: caching the selected style sheets at the server; modifying the input document to refer to the cached style sheets; and sending the modified input document to the client. When the second determining has a negative result, the technique further comprises: translating the style sheets at the server to resolve the variable factors; caching the translated style sheets at the server; and modifying the input document to refer to the cached translated style sheets. In addition, the technique further comprises sending the modified input document to the client.

The input document may be encoded in Extensible Markup Language (XML). The style sheets may be encoded in a style sheet language such as Extensible Stylesheet Language (XSL), Cascading Style Sheet Language (CSS), or Document Style Semantics and Specification Language (DSSSL).

The present invention will now be described with reference to the following drawings, in which like reference numbers denote the same element throughout.

DESCRIPTION OF THE PREFERRED EMBODIMENT

Figure 1:
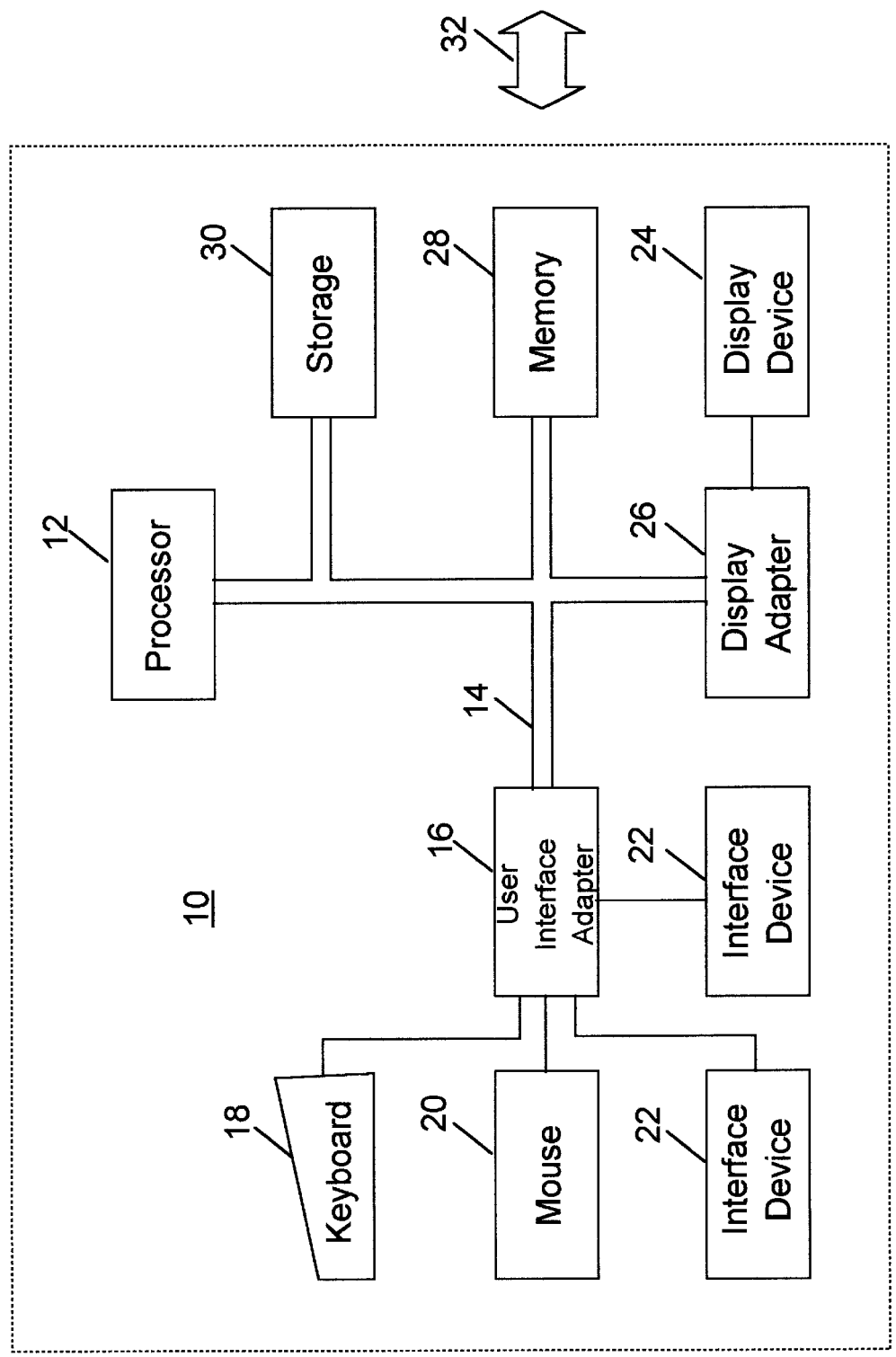
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
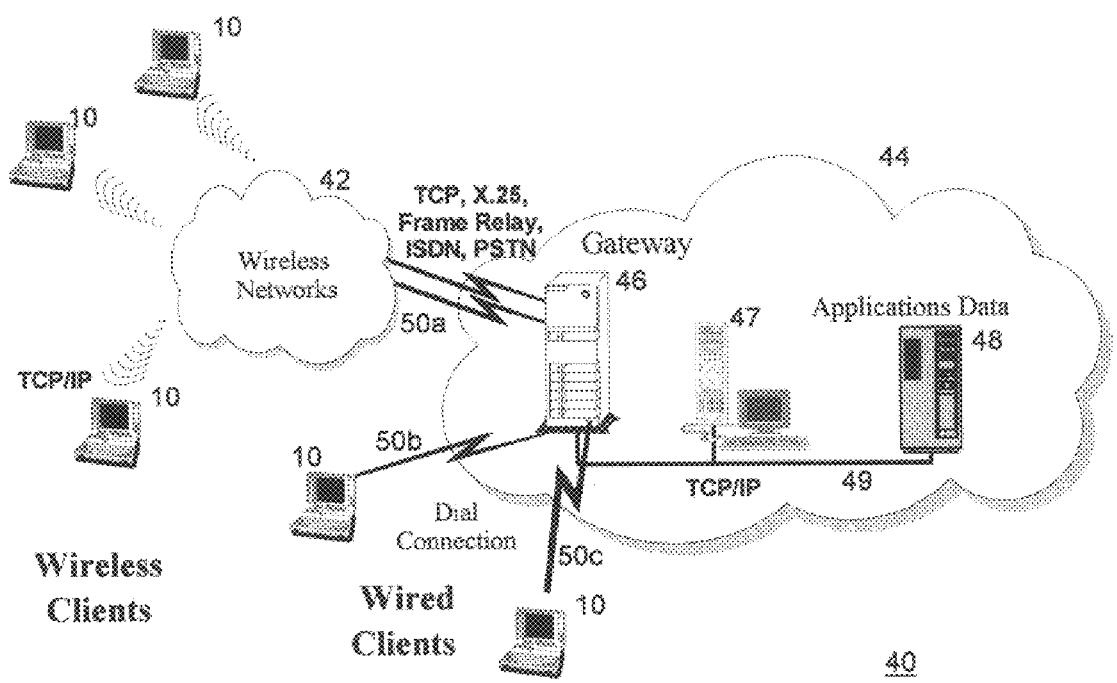
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/380 available from IBM, an Enterprise Systems Architecture/390 computer, etc. Depending on the application, a midrange computer, such as an Application System/400 (also known as an AS/400) may be employed. ("Enterprise Systems Architecture/380" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing (and optionally communication) capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiment, the present invention is implemented as one or more computer software programs. The software may operate on a server in a network, as one or more modules (also referred to as code subroutines, or "objects" in object-oriented programming) which are invoked upon request. The invention may be implemented as a transcoding plug-in which is part of an intermediate transcoding proxy, or could be integrated directly into a server using, e.g., an Apache plug-in or a WebSphere servlet. ("WebSphere" is a trademark of IBM.) For ease of reference, the term "server" will be used to denote the device on which processing is performed before sending a document to a client, whether a single device is used or whether processing is performed at more than one device (such as at a server and at an intermediate proxy). The server may be functioning as a Web server, where that Web server provides services in response to requests from a client connected through the Internet. Alternatively, the server may be in a corporate intranet or extranet of which the client's workstation is a component, or in any other network environment. While the preferred embodiment anticipates that the transformed document resulting from use of the present invention is sent to a client over a network connection, the file content may also be transferred between computers via a storage media (such as diskette), without deviating from the inventive concepts disclosed herein.

Note that the word "file" is used in this disclosure to refer to stored data. This is for ease of reference only, and is not meant to imply any particular structure for storing the data, such as conventional "flat files". The data with which the present invention may be beneficially used may be stored in any number of ways without deviating from the inventive concepts disclosed herein, such as: a data element in a database, an object attribute in a directory entry, an object in flash memory, etc.

The present invention defines a novel technique for dynamically determining the most appropriate location for applying a style sheet. When the location is determined to be a server or Web proxy, the style sheet will be applied there before transmitting the resulting document to a client. When the location is determined to be a client device, then optimizing transformations may optionally be performed at the server. The optimizing transformations preferably reduce the amount of content contained in a document before transmitting the document to the device for style sheet application and rendering of the document for presentation. It may be possible to transcode a particular document, such as an XML document, using a number of different style sheets. (For ease of reference, documents encoded in markup languages will be referred to hereinafter as "XML documents", although it is to be understood that the present invention applies to documents encoded in alternative notations as well.) Some style sheets perform just filtering (i.e. content reducing) transformations, while other perform syntax transformations (i.e. rendering) without necessarily reducing content (such as changing selected portions of a document to use a different font), and others may perform both filtering and rendering. It may happen that complex transformations (that is, application of more than one style sheet) of a document are desirable. The first related invention defines a technique for dynamically determining whether this is the case, and selecting an appropriate set of style sheets to perform a complex transformation. While the present invention may be used advantageously when only one style sheet is to be applied (i.e. by choosing the most appropriate location for performing the application), it may also be used when complex transformations are performed. When complex transformations are to be performed on a document destined for a device that is capable of applying style sheets directly, the multiple transformations may be performed in a distributed fashion. Preferably, one or more filtering style sheets will be applied at the proxy or Web server in this situation, and the rendering style sheet(s) will be applied at the client device. (Note that it is more likely that the client device will support style sheets that perform the required functions for rendering documents for its presentation capabilities, and less likely that filtering transforms will be advantageous once the document has been received at the client, thus this approach to distributed processing provides a logical separation of function that is most likely to result in optimal document processing.)

The preferred embodiment of the present invention will now be discussed in more detail with reference to FIG. 3.

The process of the present invention will be invoked when a user has requested a particular document from a server. Typically, this request will be in the form of an HTTP (HyperText Transfer Protocol) message, but may also be a request from other protocols such as the Wireless Application Protocol (WAP). The code responsible for responding to this HTTP message will invoke the process depicted in FIG. 3, making the identifier of the requested document (or the document itself) available to the implementation of the present invention as a parameter. The processing of the present invention begins at Block 300 of FIG. 3, where one or more style sheets are selected and retrieved from a directory or other repository for application to a particular input document. A number of different techniques may be used to select the style sheets to be used. The input document may contain a style sheet processing instruction (such as an xml-stylesheet processing instruction) which specifies an externally-located style sheet, using techniques which are known in the art. If so, then that style sheet is retrieved. In this case, additional style sheets which perform filtering transformations may also be selected (e.g. by reviewing the available style sheet transformations, and selecting those having both input and output notations which use the syntax created by the specified style sheet). As an alternative, the novel techniques described in the first related invention may be used to dynamically select one or more style sheets based on variable factors such as the target device and browser; any bandwidth limitations of the user's current network connection, as well as any user limitations and/or preferences; the type of the document which is being transformed; and the set of transforms which are available in a particular computing environment. As another alternative, the techniques described in the second related invention may be used, whereby characteristics of style sheets may be used in a pattern-matching process to select one or more style sheets that are appropriate in a given situation. If this pattern-matching process results in more than one set of matching style sheets, then a selection may be made from the choices using technique which do not form part of the present invention, such as applying the path selection techniques of the first related invention or other appropriate techniques. Hereinafter, the result of this selection process will be described as "style sheets", although it may happen that a single style sheet has been selected. If no suitable style sheets are located, then Block 300 may generate an exception using techniques which do not form part of the present invention.

The techniques with which the selected style sheets are subsequently retrieved from storage, following their selection, are known in the art and will not be described herein.

Once the style sheets have been selected and retrieved, a test is performed at Block 305 to determine whether the output of these style sheets generates content that is tailored for rendering on the target device. In the preferred embodiment, each style sheet will have characteristic information associated with it, specifying what the style sheet output is. This may be done using the novel techniques of the second related invention. Alternative techniques may also be used, such as storing each style sheet identifier in a lookup table that is accessible to the present invention, along with information about the characteristics of the style sheet output. As an example of the process performed by Block 305, suppose the user's device is a Smart Phone connected over a wireless connection. The selected style sheets may create output in WML (appropriate for the wireless connection and the Smart Phone device), but which does not specifically account for the device being a Smart Phone. Smart Phones are not capable of displaying tables, for example, and a style sheet that does not search for and translate table tags in an input document is therefore not "tailored" to presenting the document on this particular device. Thus, while the style sheet of this example is an appropriate choice, because it meets a portion of the requirements (generating content in WML, in this case), it is not specifically tailored for this user device. If the test at Block 305 has a negative result, then control transfers to Block 310; otherwise, processing continues at Block 325.

At Block 310, a style sheet tailored to the target environment is not available. The style sheet which has been selected may therefore be a more general-purpose style sheet which is capable of performing some type of desired filtering of data. For example, application of a content-reducing style sheet which maintains the original document type might be beneficial. As another example, transforms that manipulate data for presentation without reference to a particular presentation medium (such as "selecting out", or hiding, data matching specified patterns) may be beneficial. This approach enables the applicability of style sheets to be increased, taking advantage of the transformations coded therein whenever a benefit can be realized. Block 310 will apply the selected style sheets at the server. The resulting document may then be forwarded to a general purpose transcoding engine, as shown at Block 315. This is an optional step where more general purpose transformations (such as converting from one markup language to another) may be applied, and uses techniques which do not form part of the present invention. As one example, a general purpose transcoder which converts HTML to WML may be used, such as the Prism transcoder which is commercially available from Spyglass, Inc. As another example, a transcoding algorithm may be applied to perform 256-color to 16-color reduction for all image files being sent over wireless connections. As yet another example, the novel techniques disclosed in U.S. Pat. No. 6,138,156, which is titled "Selecting and Applying Content-Reducing Filters Based on Dynamic Environmental Factors" and is assigned to the same assignee, may be used. This invention describes a technique whereby environmental factors can be used to dynamically filter the content being delivered from a server to a user's workstation. The choice of an appropriate general purpose transcoder is preferably determined using characteristics of the target device and browser. This information may be obtained, for example, by inspecting the UserAgent field of the HTTP request. (In addition, protocols are under development for querying a device to determine this type of information, and could be used for this purpose. One such approach is the "Composite Capability/Preference Profiles", or "CC/PP", under development by W3C.) If no general purpose transcoding algorithm is located which is suitable for this document, Block 315 may be skipped, or an exception may be generated.

By invoking a general purpose transcoding engine, the present invention may be used advantageously with a new device type for which no specific style sheets are yet available. Suppose the new device requires documents encoded in WML, and the style sheet selection process of Block 300 determined that (in the absence of a style sheet tailored to this device) the best choice was a content-reducing style sheet which produces HTML. Block 315 may then invoke a transcoder capable of converting HTML to WML, as described above. In this manner, the benefit of the general content-reducing filter is used, while still being able to generate content in a markup language which the device can process.

Figure 3:
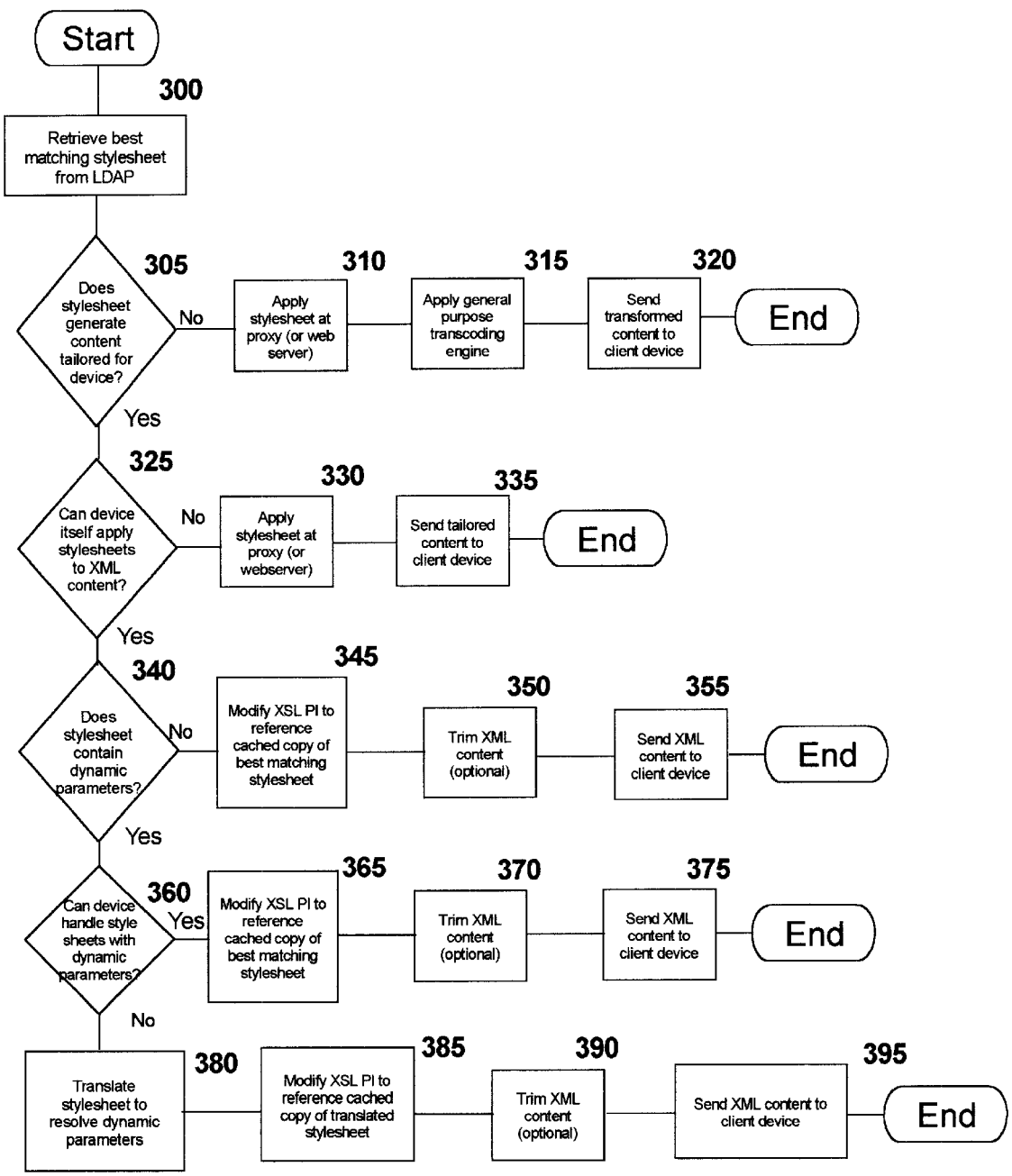
FIG. 3 (comprising FIG. 3A and FIG. 3B) illustrates a flow chart which sets forth the logic involved with the preferred embodiment of the present invention.

Following completion of Block 315, the transformed document is sent to the client device at Block 320, and the processing of FIG. 3 for this user request ends.

Control reaches Block 325 when the selected style sheets are tailored to the client device. Block 325 then checks to see if this device can itself apply style sheets. In the preferred embodiment, this is done by inspecting the value of the UserAgent field of the HTTP request header with which the document was requested. This UserAgent value will identify the browser running on the client device. (Alternatively, protocols such as CC/PP may be available for querying the device/browser to determine its capabilities dynamically.) Preferably, when the UserAgent field approach is being used, a table or list of browsers will then be consulted, where this table contains entries specifying browser names and whether each can support style sheet processing. In the preferred embodiment, this information will have been previously created and stored in a location that is accessible to the implementation of the present invention, for example by a systems administrator or software developer. (Alternatively, this type of information could be coded directly into the implementation of the present invention, although such a technique is less flexible than using an externally-stored table.)

If Block 325 has a negative result (i.e. the device cannot apply style sheets), then control transfers to Block 330, and the style sheets will be applied at the server. Block 335 then sends the resulting output document to the client, and the processing of FIG. 3 ends.

If Block 325 has a positive result, then Block 340 performs a further test to see if the style sheets include information that must be dynamically resolved, such as syntax where values for user preferences must be substituted. In the preferred embodiment, this is represented by the presence of specific tags in the style sheet, and the implementation searches for these tags. If Block 340 has a negative result, then in Block 345 the style sheets are cached in a local cache on the Web server or proxy, and the XSL processing instruction in the input document is modified to refer to this cached copy. (When a sequence of style sheets is to be applied to perform a complex transformation, the technique disclosed in the first related invention will preferably be used to chain the multiple style sheets together. The modified reference in the input document is then a reference to where the chained style sheets are cached.)

Block 350 performs an optional process to "trim" the XML document. This comprises using a pseudo-style sheet processor at the server, with the goal of reducing the size of the XML document that will be transmitted to the client in Block 355. The style sheet that will be applied to the XML document may contain rules that generate much more content for some elements, while completely omitting other elements. This optional trimming process uses the same style sheet the client will apply; and searches for the elements that will be omitted during the, actual application process. Those elements will then be omitted from the trimmed document. In the preferred embodiment, this trimming process is accomplished by associating a binary flag with each document element, where the flags are initialized to FALSE. As the style sheet rule templates are matched against the document elements, each element that is traversed during the pattern matching phase will have its flag set to TRUE. In addition, each element that is accessed during the content generation phase has its flag set to TRUE. At the end of this process, any subtrees for which the flags for all the elements remain set to FALSE will not be selected for rendering by the style sheet application process—in other words, these are the elements that will be omitted from the rendered document. The trimming process will then create a new XML document, with these elements omitted. This results in potentially reducing the content sent to the client. (As stated above, application of the style sheet at the client may greatly expand the size of the document. Thus, efficiency may still be gained when this optional trimming process is used, by delaying the actual style sheet application—and potential large increase in document size—until the document reaches the client.)

Block 355 then forwards the requested document (or the trimmed document, when Block 350 is implemented) to the client device. The client device can subsequently fetch the cached style sheet(s) using the modified reference in the document, and apply the style sheets directly to generate the transcoded result. The processing of FIG. 3 then ends.

When the test at Block 340 has a positive result (i.e. dynamic information must be resolved before applying the style sheets), then control transfers to Block 360. A further test is made at Block 360 to determine whether the client device can perform this resolution. Preferably, this information will be included in the table or list of browser information described above with reference to Block 325. If the test has a positive result, then Block 365 caches the style sheets locally and modifies the processing instruction in the input document, as described above with reference to Block 345. Block 370 optionally performs the document trimming process, which was described above with reference to Block 350. Block 375 then sends the document (either the requested document which was modified by Block 365, or the trimmed document created by Block 370, as appropriate) to the client device, and the operation of the logic in FIG. 3 ends.

When Block 360 has a negative result (i.e. the client device cannot resolve dynamic information for the style sheets), then Block 380 performs the necessary resolution, translating the style sheet (or sheets, as appropriate) so that the necessary information is included therein. In the preferred embodiment, the values to be substituted into the style sheet to reflect the dynamic information are determined by accessing a directory or other repository using techniques which are known in the art and which do not form part of the present invention. For example, the style sheet may contain dynamic parameter syntax for an element such as "<HEIGHT>", so that a scaling factor can be applied during the rendering process to scale the document for the height of the particular display on which it will be presented. The translation process will substitute the retrieved value for the dynamic parameter syntax.

Block 385 caches the translated style sheet(s) locally, and modifies the processing instruction in the sheet to reference this cached copy. Block 390 optionally performs the document trimming process, which was described above with reference to Block 350. Block 395 sends the requested document (or the trimmed document created by Block 390, as appropriate) to the client, which will subsequently fetch the style sheets and render the document locally. The processing of FIG. 3 for this document request then ends.

Although the preferred embodiment has been described as using XSL style sheets, style sheets in other notations may be used instead of XSL (e.g. Document Style Semantics and Specification Language, or DSSSL, which is an International Standard ISO/IEC 10179: 1996) without deviating from the inventive concepts of the present invention.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing environment capable of having a connection to a network, computer readable code readable by a computer system in said environment, for dynamically determining the most appropriate location for applying style sheets, comprising:

a subprocess for selecting, at a server or proxy, one or more style sheets to transform a particular input document;

a subprocess for determining, at said server or proxy, whether a client device is capable of applying said selected style sheets;

a first subprocess for processing said particular input document when said subprocess for determining has a positive result, further comprising:

a subprocess for caching said selected style sheets at said server or proxy;

a subprocess for modifying said particular input document to refer to said cached style sheets;

a subprocess for trimming said modified input document using a style sheet preprocessor, further comprising:

a subprocess for using said cached style sheets at said server or proxy to search for elements of said particular input document that will be omitted upon application of said cached style sheets; and a subprocess for removing said elements that will be omitted from said particular input document, yielding a trimmed input document;

a subprocess for sending said trimmed input document to said client device; and a subprocess for applying said cached style sheets to said trimmed input document at said client device; and a second subprocess for processing said particular input document when said subprocess for determining has a negative result, further comprising:

a subprocess for applying said selected style sheets to said particular input document at said server or proxy; and a subprocess for sending a result of said subprocess for applying to said client device following completion of said subprocess for applying at said server or proxy.

2. Computer readable code for dynamically determining the most appropriate location for applying style sheets according to claim 1, wherein:

said subprocess for determining determines a first subset of said selected style sheets that said client device is capable of applying, and a second subset that said client device is not capable of applying;

said subprocess for applying at said client device applies said first subset; and said subprocess for applying at said server or proxy applies said second subset.

3. Computer readable code for dynamically determining the most appropriate location for applying style sheets according to claim 1, wherein said subprocess for determining further comprises:

a third subprocess for determining, at said server or proxy, whether one or more of said selected style sheets requires resolution of variable factors specified in said one or more selected style sheets; and a fourth subprocess for determining whether said client device is capable of resolving said variable factors when (i) said third subprocess has a positive result and (ii) said subprocess for determining has a positive result; and further comprising:

a fifth subprocess for resolving said variable factors, prior to operation of said first subprocess, when said fourth subprocess has a negative result, further comprising:

a subprocess for translating said style sheets at said server or proxy to resolve said variable factors; and wherein said subprocess for caching caches said translated style sheets at said server or proxy.

4. Computer readable code for dynamically determining the most appropriate location for applying style sheets according to claim 1, wherein said input document is encoded in Extensible Markup Language (XML) and said style sheets are encoded in Extensible Stylesheet Language (XSL).

5. Computer readable code for dynamically determining the most appropriate location for applying style sheets according to claim 1, wherein said input document is encoded in Extensible Markup Language (XML) and said style sheets are encoded in Document Style Semantics and Specification Language (DSSSL).

6. A system for dynamically determining the most appropriate location for applying style sheets in a computing environment capable of having a connection to a network, comprising:

means for selecting, at a server or proxy, one or more style sheets to transform a particular input document;

means for determining, at said server or proxy, whether a client device is capable of applying said selected style sheets;

first means for processing said particular input document when said means for determining has a positive result, further comprising:

means for caching said selected style sheets at said server or proxy;

means for modifying said particular input document to refer to said cached style sheets;

means for trimming said modified input document using a style sheet preprocessor, further comprising:

means for using said cached style sheets at said server or proxy to search for elements of said particular input document that will be omitted upon application of said cached style sheets; and means for removing said elements that will be omitted from said particular input document, yielding a trimmed input document;

means for sending said trimmed input document to said client device; and means for applying said cached style sheets to said trimmed input document at said client device; and second means for processing said particular input document when said means for determining has a negative result, further comprising:

means for applying said selected style sheets to said particular input document at said server or proxy; and means for sending a result of said means for applying to said client device following completion of said means for applying at said server or proxy.

7. The system for dynamically determining the most appropriate location for applying style sheets according to claim 6, wherein:

said means for determining determines a first subset of said selected style sheets that said client device is capable of applying, and a second subset that said client device is not capable of applying;

said means for applying at said client applies said first subset; and said means for applying at said server or proxy applies said second subset.

8. The system for dynamically determining the most appropriate location for applying style sheets according to claim 6, wherein said means for determining further comprises:

third means for determining, at said server or proxy, whether one or more of said selected style sheets requires resolution of variable factors specified in said one or more selected style sheets; and fourth means for determining whether said client device is capable of resolving said variable factors when (i) said third means has a positive result and (ii) said means for determining has a positive result; and further comprising:

fifth means for resolving said variable factors, prior to operation of said first means, when said fourth means has a negative result, further comprising:

means for translating said style sheets at said server or proxy to resolve said variable factors; and wherein said means for caching caches said translated style sheets at said server or proxy.

9. The system for dynamically determining the most appropriate location for applying style sheets according to claim 6, wherein said input document is encoded in Extensible Markup Language (XML) and said style sheets are encoded in Extensible Stylesheet Language (XSL).

10. The system for dynamically determining the most appropriate location for applying style sheets according to claim 6, wherein said input document is encoded in Extensible Markup Language (XML) and said style sheets are encoded in Document Style Semantics and Specification Language (DSSSL).

11. A method for dynamically determining the most appropriate location for applying style sheets in a computing environment capable of having a connection to a network, comprising the steps of:

selecting, at a server or proxy, one or more style sheets to transform a particular input document;

determining, at said server or proxy, whether a client device is capable of applying said selected style sheets;

a first step of processing said particular input document when said determining step has a positive result, further comprising the steps of:

caching said selected style sheets at said server or proxy;

modifying said particular input document to refer to said cached style sheets;

trimming said modified input document using a style sheet preprocessor, further comprising steps of:

using said cached style sheets at said server or proxy to search for elements of said particular input document that will be omitted upon application of said cached style sheets; and removing said elements that will be omitted from said particular input document, yielding a trimmed input document;

sending said trimmed input document to said client device; and applying said cached style sheets to said trimmed input document at said client device; and a second step of processing said particular input document when said determining step has a negative result, further comprising the steps of:

applying said selected style sheets to said particular input document at said server or proxy; and sending a result of said applying step to said client device following completion of said applying at said server or proxy step.

12. The method for dynamically determining the most appropriate location for applying style sheets according to claim 11, wherein:

said determining step determines a first subset of said selected style sheets that said client device is capable of applying, and a second subset that said client device is not capable of applying;

said applying at said client step applies said first subset; and said applying at said server or proxy step applies said second subset.

13. The method for dynamically determining the most appropriate location for applying style sheets according to claim 11, wherein said determining step farther comprises the steps of:

a third step of determining, at said server Or proxy, whether one or more of said selected style sheets requires resolution of variable factors specified in said one or more selected style sheets;

a fourth step of determining, at said server or proxy, whether said client device is capable of resolving said variable factors when (i) said third step has a positive result and (ii) said a determining step has a positive result; and further comprising the step of:

a fifth step of resolving said variable factors, prior to operation of said first step, when said fourth step has a negative result, further comprising the step of:

translating said style sheets at said server or proxy to resolve said variable factors; and wherein said step of caching caches said translated style sheets at said server or proxy.

14. The method for dynamically determining the most appropriate location for applying style sheets according to claim 11, wherein said input document is encoded in Extensible Markup Language (XML) and said style sheets are encoded in Extensible Stylesheet Language (XSL).

15. The method for dynamically determining the most appropriate location for applying style sheets according to claim 11, wherein said input document is encoded in Extensible Markup Language (XML) and said style sheets are encoded in Document Style Semantics and Specification Language (DSSSL).

\* \* \* \* \*